(12) United States Patent
Patrito

(10) Patent No.: US 6,398,005 B1
(45) Date of Patent: Jun. 4, 2002

(54) CONVEYANCE SYSTEM WITH SKID HANDLING

(75) Inventor: Donato Patrito, Leini' (IT)

(73) Assignee: Fata Automation S.p.A., Pianezza (IT)

( * ) Notice: Subject to any disclaimer, the term of this patent is extended or adjusted under 35 U.S.C. 154(b) by 0 days.

(21) Appl. No.: 09/469,241

(22) Filed: Dec. 22, 1999

(51) Int. Cl.$^7$ .............................................. B65G 37/00
(52) U.S. Cl. ................................. 198/347.1; 198/347.4
(58) Field of Search .......................... 198/347.1, 347.3, 198/347.4, 465.2

(56) References Cited

U.S. PATENT DOCUMENTS

| | | | |
|---|---|---|---|
| 1,326,949 A | | 1/1920 | Meehan |
| 3,173,557 A | * | 3/1965 | Eliassen ................... 198/347.4 |
| 4,085,759 A | * | 4/1978 | Seragnoli ............. 198/347.3 X |
| 4,736,830 A | | 4/1988 | Hofmann .................... 198/345 |
| 5,090,555 A | | 2/1992 | Kura ....................... 198/465.1 |
| 5,125,782 A | * | 6/1992 | Goldschmidt et al. .................... 198/347.1 X |
| 5,350,050 A | * | 9/1994 | Franke ..................... 198/347.1 |
| 5,411,131 A | * | 5/1995 | Haegele ............... 198/347.4 X |
| 5,669,309 A | | 9/1997 | Carlton et al. .............. 104/162 |

FOREIGN PATENT DOCUMENTS

| | | | | |
|---|---|---|---|---|
| DE | 2259771 | * | 6/1974 | .............. 198/347.1 |
| EP | 0034335 | | 8/1981 | |
| JP | 62-157123 | * | 7/1987 | .............. 198/347.1 |
| JP | 5-124721 | * | 5/1993 | .............. 198/347.1 |

* cited by examiner

*Primary Examiner*—James R. Bidwell
(74) *Attorney, Agent, or Firm*—Jacobson Holman, PLLC

(57) ABSTRACT

A skid handling system includes at least two skid conveyance lines for skid handling with a transfer arranged between them to pass skids from one to the other. The transfer includes a skid conveyor with a clearance table at each end at the transfer point from and to the two conveyance lines. The skids are accumulated directly on the conveyor between the tables.

8 Claims, 3 Drawing Sheets

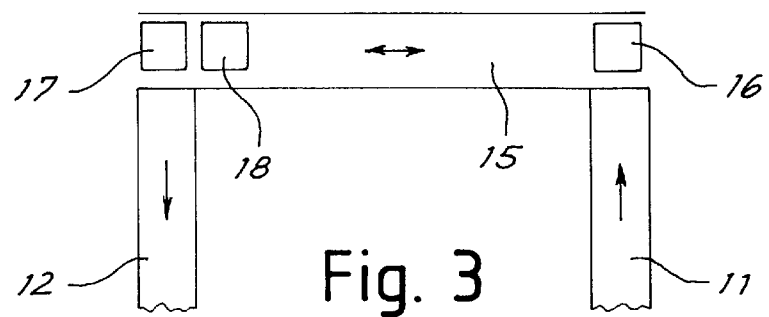
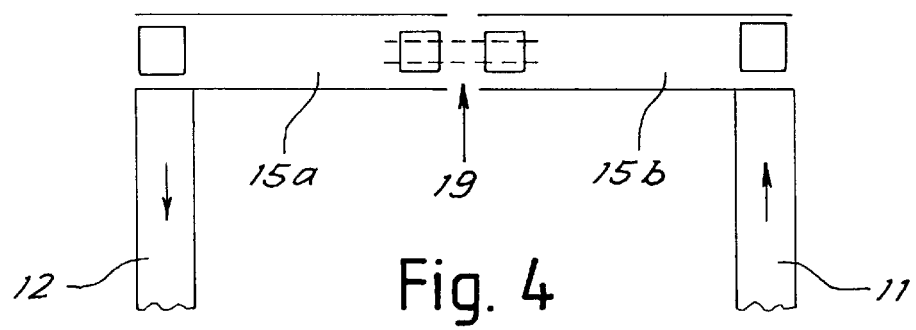
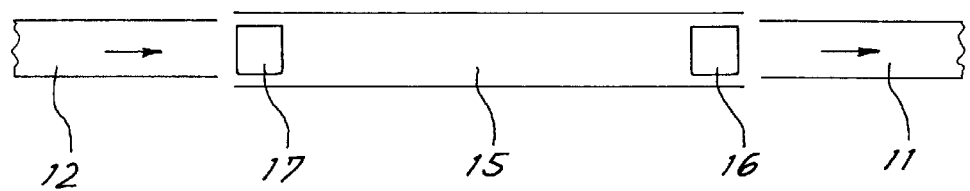
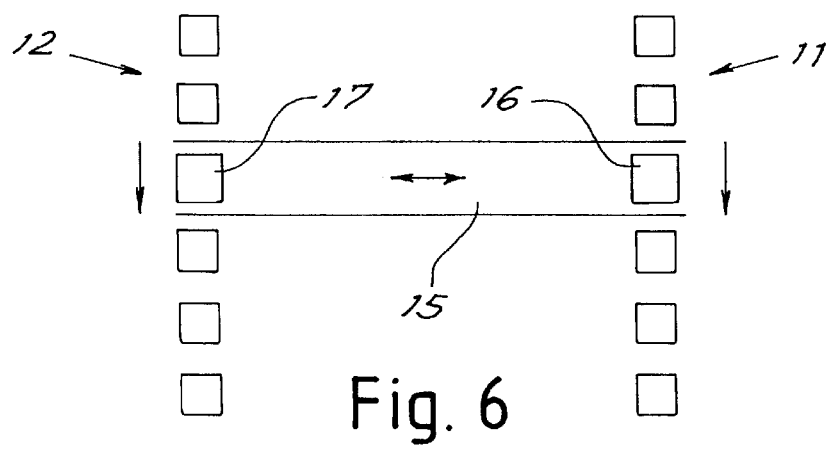

CONVEYANCE SYSTEM WITH SKID HANDLING

BACKGROUND OF THE INVENTION

The present invention relates to a conveyance system of the type with skid handling and in particular to the area of the system where the system of transfer of skids from one path to another is located.

Conveyance systems of the type termed 'skid' or 'skid systems' used for internal handling in industrial plants are known. These systems are made up of an assemblage of various handling means such as chain or belt, chain accumulation conveyors with idling rollers, powered roller conveyors termed 'roller tables', rotary tables, head transfers with clearance and hold tables et cetera. Load support members in the form of skids and circulating this way along the system with paths, speeds, stop and wait times which depend on the programmed cycles and are controlled by purposeful electrical control equipment rest on the handling means.

As regards the head transfers which connect transversely two connected lines arranged parallel between them they have heretofore been equipped with a plurality of release and wait tables to allow regular flow from one line to the other, allow a certain accumulation of loaded or empty skids, and keep available a certain number of free positions (free tables) to give flexibility to the operation of both the main lines.

To function, the intermediate tables have to be equipped with skid raising, lowering, stopping and alignment means and are piloted by the central system.

The end tables are also equipped with motorized rollers to allow the skid to enter and leave the transfer at a right angle.

Only in special cases can the tables be eliminated i.e. when the skid is equipped with soles broad enough to rest well on supplementary idling rollers applied to the chain and with overall dimensions of the loads conveyed less than that of the skids. Control stops are arranged on the outlet side of the conveyor to stop arriving skids and prevent their uncontrolled outlet. Suitable conditions occur only in a few cases and such a solution cannot be generalized.

It has also been proposed to divide the transfer in many members with room for a single skid. This system is limited by the relative difficulty of housing the motorization in inter-connected systems, reduction of available spaces and high costs.

If relatively short the head transfers could employ only two end tables side-by-side but they would lose the accumulation function provided by the intermediate tables and consequently their operating flexibility.

The general purpose of the present invention is to overcome the above shortcomings by supplying a skid system equipped with a transfer of advanced conception.

SUMMARY OF THE INVENTION

In view of this purpose it is sought to provide in accordance with the present invention a skid handling system comprising at least two skid conveyance lines with a transfer arranged between the two lines to pass skids from one to the other characterized in that the transfer comprises a skid conveyor with a clearance table at each end at the transfer point from and to said two conveyance lines and skids are accumulated on the conveyor between the tables.

BRIEF DESCRIPTION OF THE DRAWINGS

To clarify the explanation of the innovative principles of the present invention and its advantages compared with the prior art there is described below with the aid of the annexed drawings a possible embodiment thereof by way of non-limiting example applying said principles. In the drawings.

DETAILED DESCRIPTION OF THE INVENTION

Figure 1:
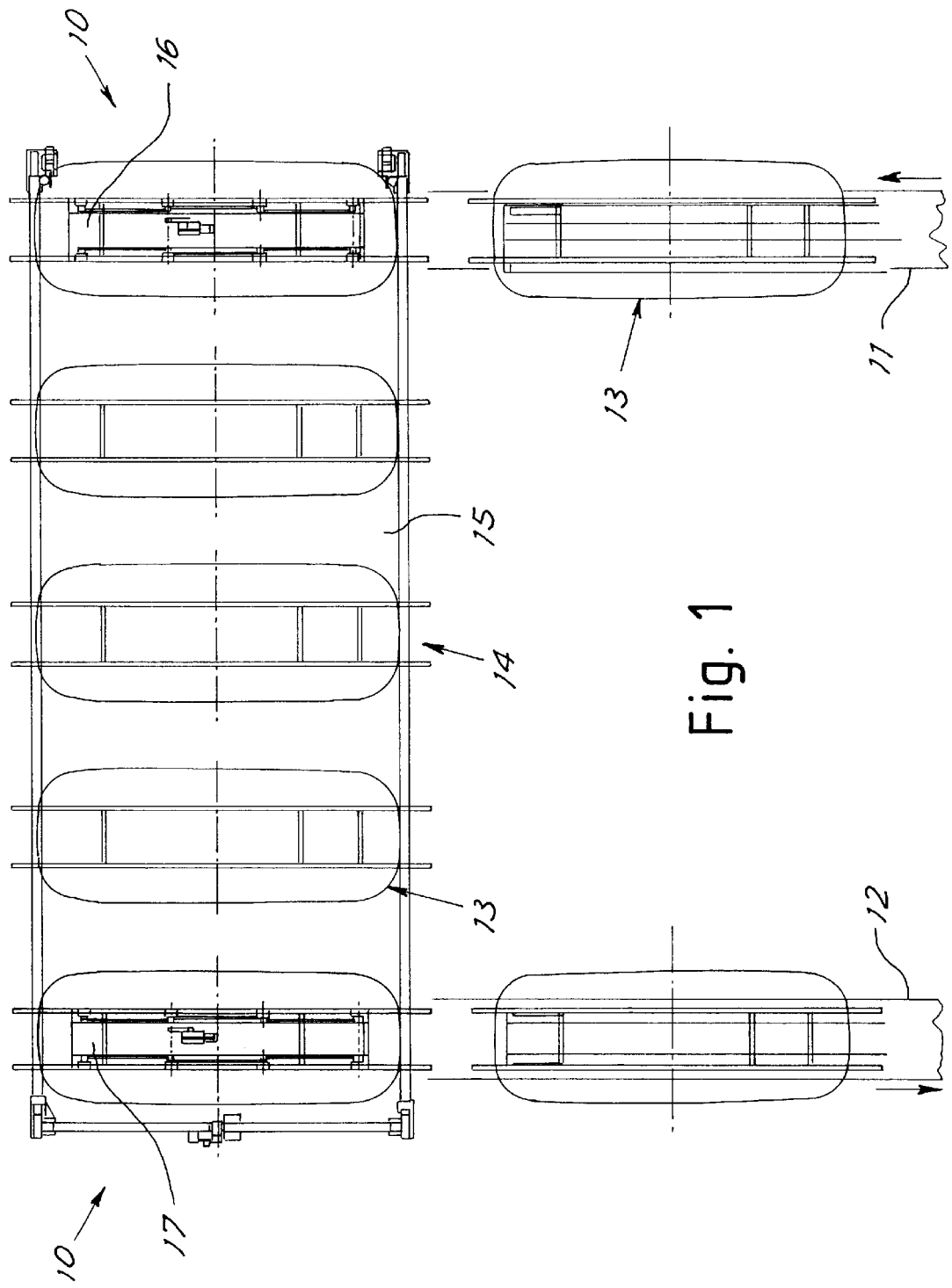
FIG. 1 shows a diagrammatic plan view of a system with transfer in accordance with the present invention.

With reference to the FIGS a skid system indicated as a whole by reference number 10 comprises at least one first conveyance line 11 and a second conveyance line 12 on which are moved a plurality of skids 13. FIG. 1 shows the arrival end of line 11 and the departure end of line 12. Between the two lines there is a transfer 14 which transfers skids from one line to the other. In accordance with the present invention the transfer 14 is made up of a step conveyor 15 designed for conveyance of skids and two clearance tables 16, 17 arranged at the ends of the conveyance lines 11 and 12.

Skids are accumulated on the transfer as the conveyor 15, for example chain or belt, moves one step between one skid space and the next (performed by the inlet table 16) so as to arrange the skids equidistantly on the conveyor 15. A compact accumulation of skids without empty spaces between them is formed on the conveyor. The empty spaces are brought together on the outlet side of the conveyor with the exception of the space occupied by the outlet table which usually supports a skid ready for outlet on line 12. When the outlet table is freed and it is necessary to have the next skid available at outlet the entire group of skids on the conveyor moves until it brings the skid furthest downstream opposite the clearance table 17 which rises and sends skid to the conveyance line outlet 12.

If in the meantime a new skid arrives on the inlet table the entire skid group on the conveyor moves back until skid furthermost upstream reaches one step from the skid on the inlet table. At this point the table lowers and the skid group moves one step towards the outlet and remains there until a new condition arises.

To summarize, the skid group moves toward the inlet when a new skid is to enter and towards the outlet when a skid is to leave or one enters and space must be created for the next one entering. When there are no skids in intermediate positions resting on the conveyor 15 the entering skid is deposited by the table on the conveyor and moves one step towards the outlet to leave the space to the next one. When there are skids on the conveyor and the empty spaces are on the inlet side the conveyor must move backward until the last skid introduced is located in the position immediately downstream of the inlet table before lowering the table and depositing the just arrived skid on the conveyor.

Figure 2:
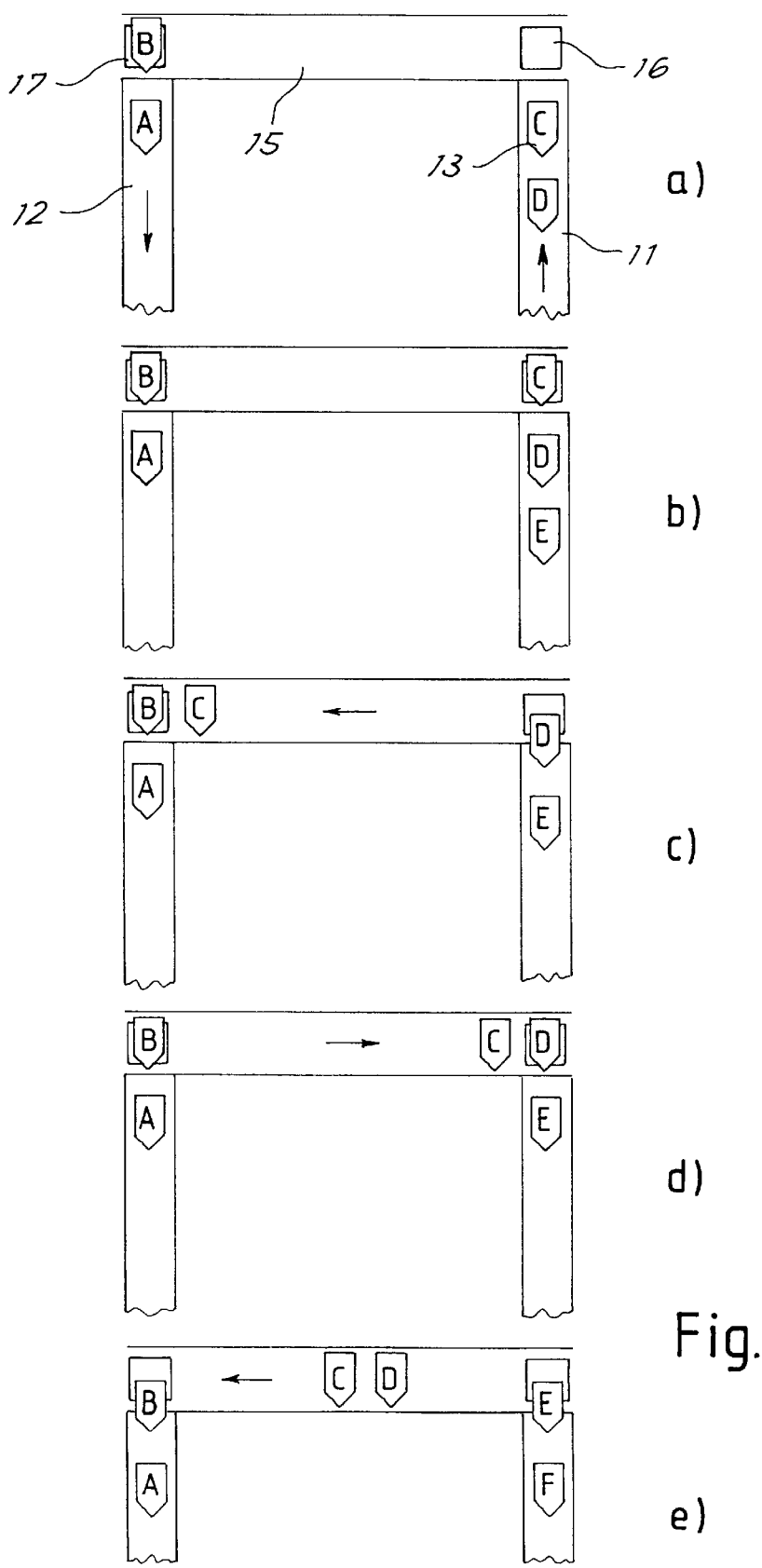
FIG. 2 shows a possible operation sequence of the transfer of FIG. 1, and FIGS. 3–6 show diagrammatic views of possible variants.

FIGS. 2a–2e show operating phases of the system. FIG. 2a shows an intermediate phase in which skid A is already on line 12, skid B has already been conveyed by the conveyor 15 onto the outlet table 17, and skids C and D and subsequently E and F are arriving at the head of line 11. Skid B is ready to be unloaded on request on line 12 by operation of the table 17.

As shown in FIG. 2b as the arrival line 11 advances skid C at the head is received on the arrival table 16 and deposited therefrom onto the conveyor 15. The conveyor 15 can be advanced one position to unload the inlet table and make space for the following skid D arriving. This way skids arriving progressively accumulate on the conveyor (FIG. 2d).

But it has been found advantageous to provide accumulation downstream of the conveyor 15 so as to minimize the time for unloading on line 12. For this reason the conveyor 15 is commanded to carry skid C near the outlet table (FIG. 2c) and when a new skid D is to be transferred if skid C has not yet been evacuated the conveyor 15 is run backward until it takes it back near the inlet table. Skid D is thus located beside skid C (FIG. 2d) and the two skids C and D are taken back towards the outlet. This procedure is repeated upon the arrival of each new skid. When the outlet table is unloaded on line 12 the first skid of those on the conveyor 15 is taken onto the outlet table to be unloaded subsequently.

The handling management system can oversee inlets and outlets to prevent the transfer from beginning backward movement by a few steps to go and receive a new skid a moment before it should make a forward movement by only one step to feed the outlet table again.

It is now clear that the preset purposes have been achieved by supplying a very flexible and simplified transfer device.

FIG. 3 shows a variant embodiment in which there is another holding table 18 in the transfer outlet zone. The table 18 is beside the table 17 which is aligned with the outlet conveyance line 12. This variant allows having two skids available for feeding the outlet line 12. This allows halving handling time.

FIG. 4 shows another variant usable when the distance between the two conveyors is considerable and handling time relatively short. In this variant the conveyor 15 is split into two conveyors 15a and 15b connected by a shuttle or transfer unit 19 (virtually prior art) which rapidly transfers a skid from one conveyor to the other. It is thus possible to separate operation of the two conveyor segments with the advantage of being able to optimize the respective to and for movements.

Naturally the above description of an embodiment applying the innovative principles of the present invention is given by way of non-limiting example of said principles within the scope of the exclusive right claimed here. For example lines 11, 12 could also not be parallel with each other. FIG. 5 shows a system with lines 11, 12 aligned with the transfer. In addition the conveyance lines could be of any known skid conveyance type. FIG. 6 for example shows a 2-line system embodied with roller tables in which the transfer is arranged in an intermediate position along the lines to perform selective transfer from one line to the other either always in the same direction or as an alternative (in lots) for example for redistributing production flows.

What is claimed is:

1. Skid handling system comprising
   at least two skid conveyance lines,
   a transfer arranged between the at least two skid conveyance lines to pass skids from one of the at least two skid conveyance lines to another of the at least two skid conveyance lines,
   the transfer comprises a skid conveyor with a clearance table at each end of the skid conveyor at a transfer point from and to said at least two skid conveyance lines and skids being accumulated on the skid conveyor between the clearance tables, the skid conveyor being movable in opposite directions to carry skids towards and away from the clearance tables at each end of the skid conveyor so as to line up a new skid from one of the clearance tables adjacent to a skid already on the skid conveyor by reversing direction of travel of the skid conveyor and to again reverse direction of travel of the skid conveyor to unload a leading skid from the skid conveyor at the other of the clearance tables.

2. Handling system in accordance with claim 1, wherein the at least two skid conveyance lines and the transfer are aligned.

3. Handling system in accordance with claim 1, wherein the skid conveyor is the chain or belt type.

4. Handling system in accordance with claim 1, wherein the skid conveyor moves towards the one clearance table when an arriving skid is to be lined up with skids thereon and moves towards the the other clearance table when a skid is to be unloaded from the the other clearance table.

5. Handling system in accordance with claim 1, wherein another clearance table is set beside the the other clearance table to constitute temporary support for a skid carried by the skid conveyor.

6. Handling system in accordance with claim 1, wherein the skid conveyor is divided in two conveyors connected by a unit for transfer of skids from one to the other.

7. Handling system in accordance with claim 1, wherein the at least two skid conveyance lines are mutually parallel and the transfer is arranged at a right angle between them.

8. Handling system in accordance with claim 7, wherein the transfer is arranged in an intermediate position along the at least two skid conveyance lines.

\* \* \* \* \*